United States Patent [19]

Bailey

[11] Patent Number: 4,606,667
[45] Date of Patent: Aug. 19, 1986

[54] CONTROLLED DECELERATION STOPPING DEVICE FOR ROBOT BASE

[75] Inventor: Edward J. Bailey, Cincinnati, Ohio

[73] Assignee: Cincinnati Milacron Inc., Cincinnati, Ohio

[21] Appl. No.: 720,776

[22] Filed: Apr. 8, 1985

[51] Int. Cl.[4] ............................................. F16C 11/00
[52] U.S. Cl. .................................... 403/117; 403/113; 74/526; 248/658; 192/149; 901/11; 901/17
[58] Field of Search ......................... 74/526; 248/658; 212/151, 223, 245; 901/11, 17, 49, 50; 192/149; 403/117, 113; 414/744 R

[56] References Cited

U.S. PATENT DOCUMENTS

| | | | |
|---|---|---|---|
| 2,978,940 | 4/1961 | Jeanneret | 74/526 |
| 3,896,681 | 7/1975 | Boyle | 74/526 |
| 4,064,997 | 12/1977 | Holland et al. | 212/151 |

*Primary Examiner*—Cornelius J. Husar
*Assistant Examiner*—Joseph A. Fischetti

*Attorney, Agent, or Firm*—Thomas M. Farrell

[57] ABSTRACT

A stationary robotic base carries a movable robotic platform and supports a pair of vertical striker plates spaced apart by a central, elastomeric block. The striker plates are confined within a compartment of the stationary base, and extend upward into a pathway defined by a lug depending from the moving platform. The lug contacts the top portion of a given striker plate and, as the plate is struck, it tends to pivot about its bottom edge toward the other plate, compressing the elastomeric block, while the other plate is held from moving away from the block. The assembly is bidirectional, with each striker plate being yieldable toward the other as it is encountered by the moving lug. In the event that the moving element possesses more energy than the maximum stopping energy of the elastomeric block, the first encountered striker plate will pivot to such position that the lug will overtravel the striker plate and pass over the elastomeric block until it comes to rest against the stationary, nonpivoting striker plate.

2 Claims, 5 Drawing Figures

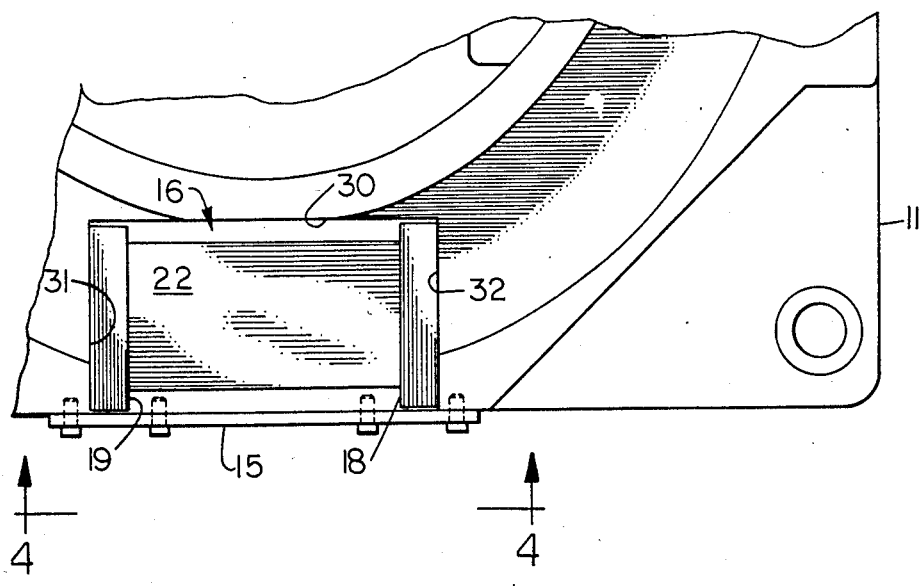
FIG. 3
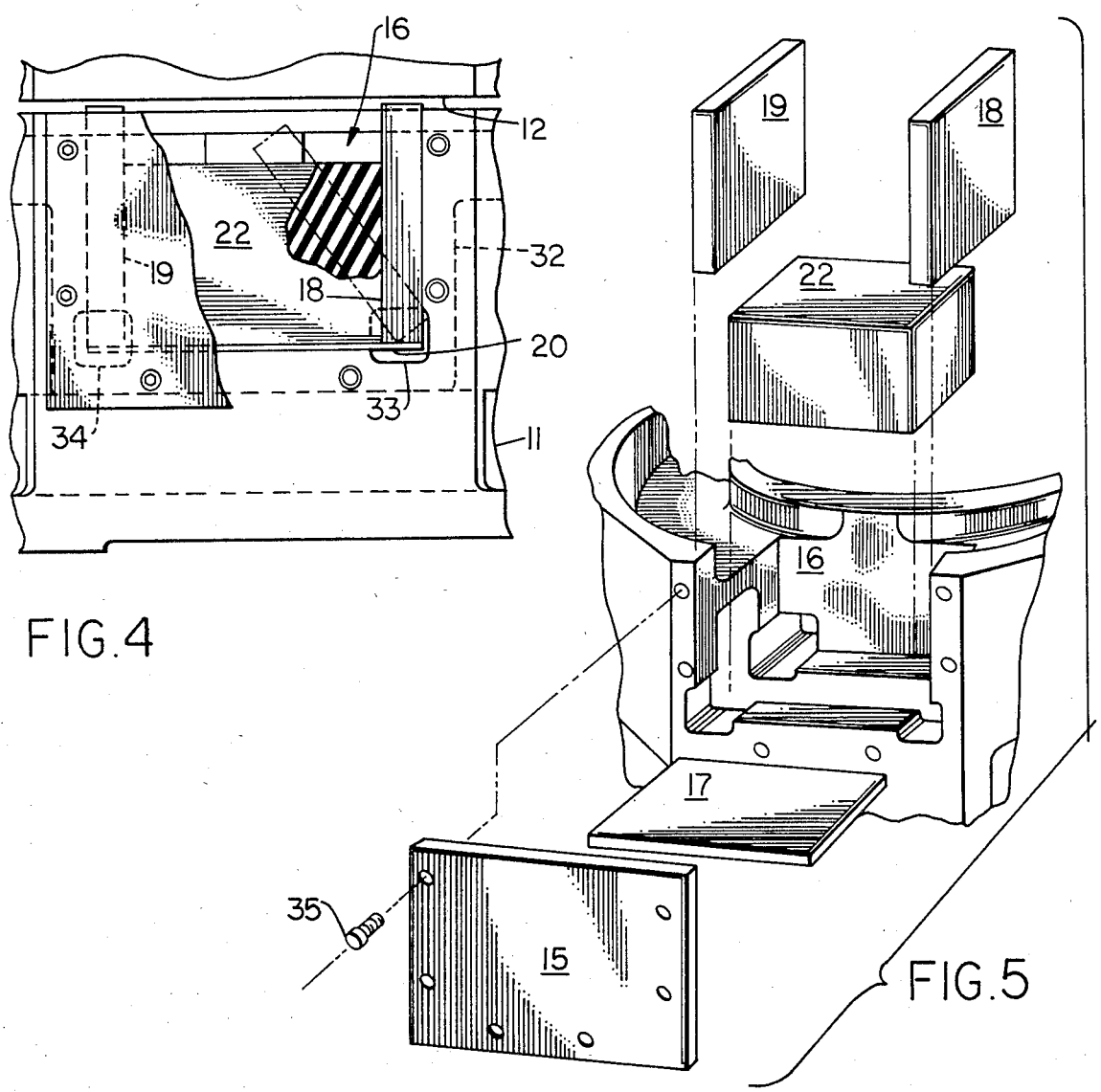
FIG. 4
FIG. 5

CONTROLLED DECELERATION STOPPING DEVICE FOR ROBOT BASE

BACKGROUND OF THE INVENTION

The invention relates generally to devices for slowing and stopping movable machine elements, particularly those devices which embody energy absorption elements. The invention is broadly applicable to movable robot platforms or bases, and is especially applicable to rotatable robot platforms having a bi-directional range of movement of less than 360°.

Many industrial robots, including the articulated arm types and coordinately movable slide systems, are supported on a rotatable platform which, in turn, is typically journalled on a fixed robot base to provide the system with a rotary axis of movement. The rotatable platform is power driven from the fixed base and is typically positioned in response to a signal generated by a position sensing element such as an encoder or resolver affixed to the drive system. Maximum end-of-travel stops are provided to limit the platform travel.

If a rotatable platform is stopped in its movement by rigid stopping elements, the shock may result in deleterious conditions. For example: workpieces may be jostled in their respective grippers; the drive train may be damaged; and loosening of robotic components may occur.

Energy-absorbing snubbers and shock absorbers are well-known in machine fields, and a typical design involves a piston and cylinder coacting against a fluid interface in much the same manner as the action of an automobile shock absorber applied between the body and frame. Prior art shock absorbers have certain disadvantageous features; for example: loss of effectiveness due to seal wear; fluid leakage in hydraulic devices; linear stroke and relatively long dimensions in both pneumatic and hydraulic devices; certain rubber bumpers are contacted directly and tend to degrade quickly. Additionally, the prior art devices are generally unidirectional in function.

In contrast to the prior art devices, applicant has conceived a novel mechanical stop device for arresting movement of a robotic platform where the stop embodies shock-absorbing and controlled deceleration characteristics and, secondarily, provides for stopping of overtravel in the event of rapid degradation of the cushion element. The stop is also configured to act against bi-directional rotary movement.

It is therefore an object of the present invention to provide a compact, simplified, cushioned stop for a movable robotic platform.

Another object of the present invention is to provide a mechanical cushioned stop for a robotic platform which is relatively trouble-free and maintenance-free.

A further object of the invention is to provide a mechanical robotic platform stop having controlled deceleration characteristics.

SUMMARY OF THE INVENTION

The invention is shown embodied in a robot having a (relatively) stationary base and a moving platform, where the improved means for stopping the moving member comprises a lug affixed to, and extending downward from, the moving member, and where the lug moves along a defined lug path. An elastomeric block is supported on the stationary base and is backed up by a relatively fixed base-carried element. A striker plate is supported in a generally vertical attitude along a bottom edge adjacent to the elastomeric block and extends upward into the lug path. The striker plate is contacted by the moving lug near its topmost edge so that the striker plate will tip about its supported edge when contacted by said lug, and thereby compress the elastomeric block, effecting slowing and stopping of the moving member.

BRIEF DESCRIPTION OF THE DRAWINGS

FIG. 3 is a plan section taken along the line 3—3 of FIG. 2.

FIG. 4 is a front elevational view taken along the line 4—4 of FIG. 3.

FIG. 5 is an exploded perspective view.

DESCRIPTION OF THE PREFERRED EMBODIMENT

Figure 1:
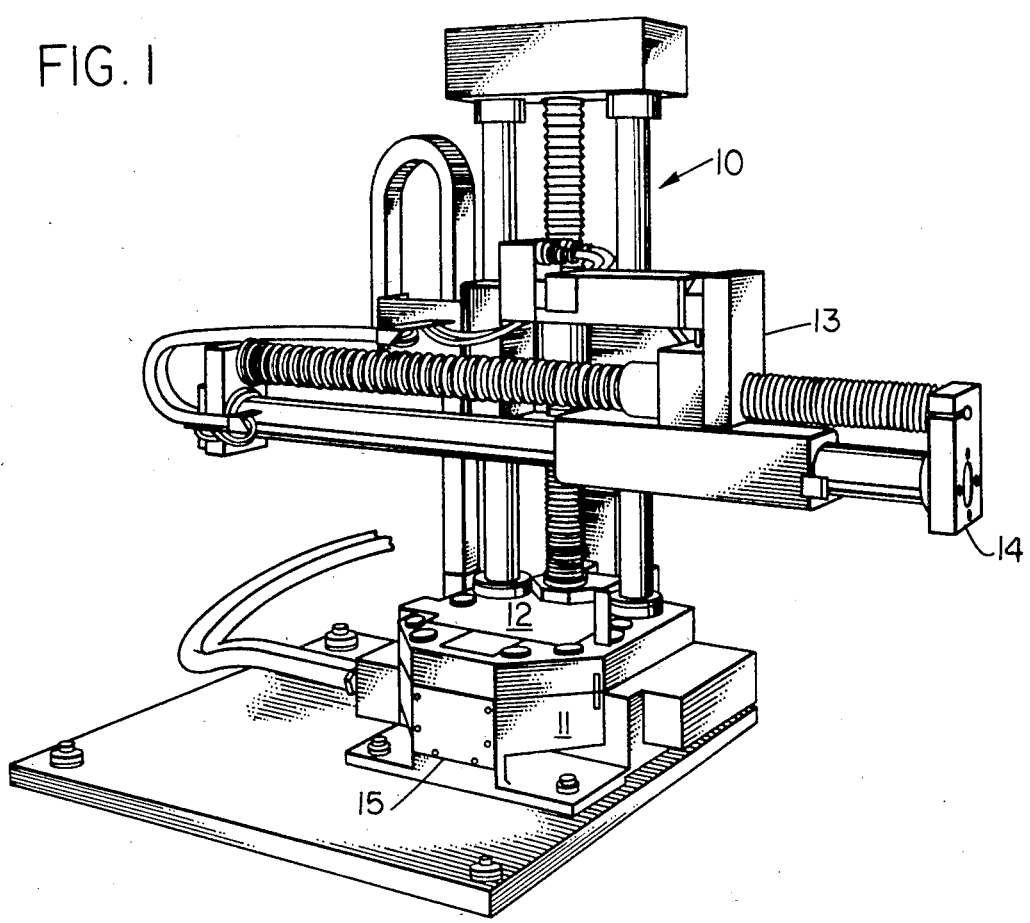
FIG. 1 is a perspective view of an industrial robot having a stationary base and rotatable platform.

FIG. 1 of the drawings depicts an industrial robot 10 of the type and class known as Model 363, manufactured by Cincinnati Milacron Inc., the assignee of the present invention. The robot 10 has a stationary base 11, supporting a platform 12 which is bi-directionally rotatable through approximately 300° of rotary motion, around a vertical axis on the base 11 in response to a base drive (not shown). The robot platform 12, in turn, supports the coordinately movable assembly 13 used for maneuvering a work gripping device (not shown) which may be located on the end effector 14.

Figure 2:
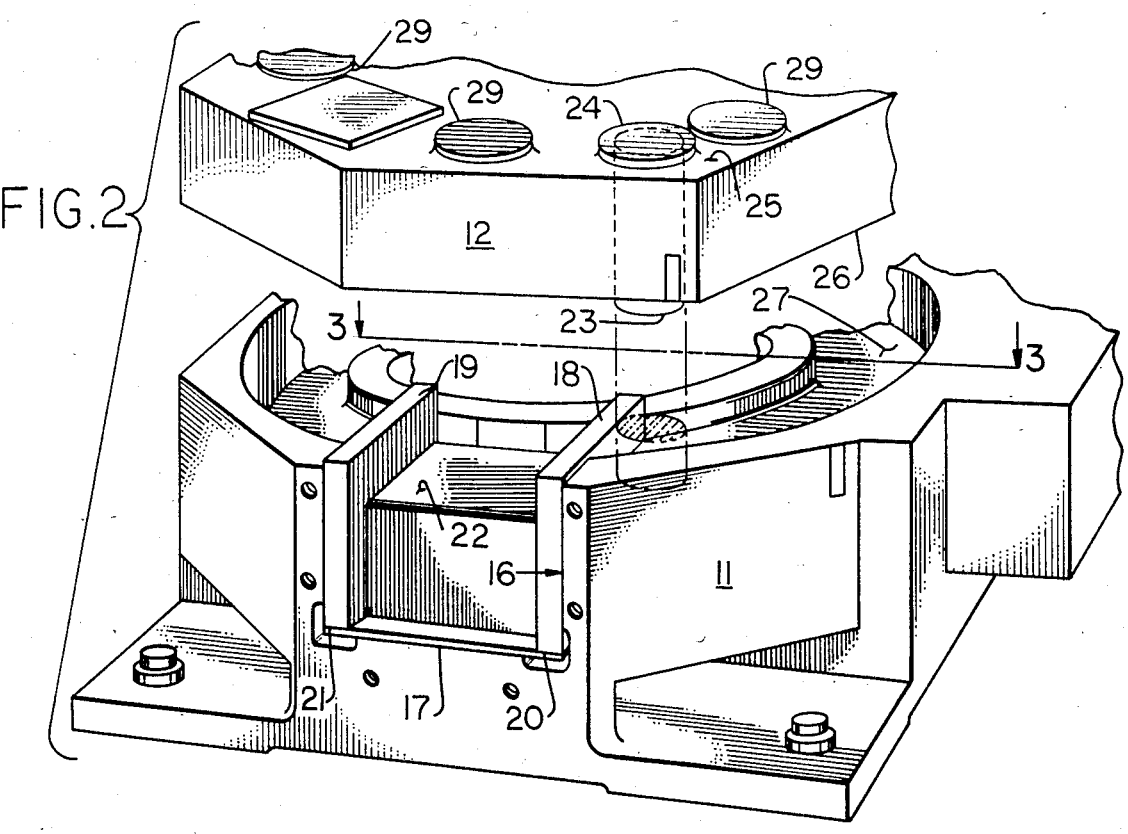
FIG. 2 is an enlarged perspective view in partial section of the front portion of the robotic base of FIG. 1.

FIG. 2 illustrates the stationary base 11 of the robot 10 with the front cover plate 15 (FIG. 1) removed for clarity. The base 11 has a compartment 16 formed by integral walls (FIG. 5). The compartment 16 supports a bottom plate 17, and a pair of vertical rectangular striker plates 18,19 are supported along their bottom edges 20,21 on the bottom plate 17. A rectangular elastomeric block 22 is snuggly fitted between the striker plates 18,19 to maintain plate separation.

The rotatable platform 12 carries a rigid cylindrical pin, or stop lug 23, which has a head 24 affixed to the top side 25 of the platform 12. The stop lug 23 depends from the bottom 26 of the platform 12 and travels through a rotary lug path 27 defined in the robot base 11, which is obstruction-free until one or the other of the striker plates 18,19 is encountered. In the embodiment shown, the lug path 27 comprises a cast annular channel in the base 11, the lug 23 intercepts the striker plate 18 for a short length below the top edge 28 of the plate 18. The lug 23 may be re-positioned in a variety of other pin-receiving sockets 29 to govern arcuate movement of the robot 10. Further, plural lugs 23 may also be used to define limits of arc-sector movement.

Referring to FIG. 3, the striker plates 18,19 are seen to be loosely received between the back wall 30 of the base compartment 16 and the front cover plate 15. The plates 18,19 are backed up by left and right sidewalls 31,32 in the compartment 16 so that they are only free to move toward one another, i.e. against the elastomeric block 22 (see FIG. 4). Relief cores 33,34 are provided through the base compartment 16 to allow the plates 18,19 to pivot smoothly. Thus, it can be seen that the rotary movement of the platform 12 along its horizontal plane will cause the lug 23 to contact the respective striker plate 18, and the plate 18 will tend to pivot about its bottom edge 20. The downward pivoting movement will compress the block 22, causing it to tend to bulge against the back wall 30 and the cover plate 15, as shown by the phantom lines in FIG. 3. Thus controlled deceleration is achieved. The plate 18 is prevented from kicking back by the sidewall 32 of the compartment 16. In the event that the elastomeric block 22 is incapable of absorbing the stopping energy of the rotatable platform 12, or that the block 22 has deteriorated, the pivoting striker plate 18 will swing down to such position that the lug 23 will no longer contact the top portion of the plate 18. The lug 23 will then pass over the elastomeric block 22 until it contacts the other plate 19. The rigidly-supported backup striker plate 19 thus forms a positive stop for any overtravel movement. In the preferred embodiment, therefore, the plates 18,19 are spaced far enough to permit this overtravel.

The controlled deceleration rate is predictable, depending principally on the characteristics of the elastomeric block 22, i.e. durometer rating, initial shape, etc.

The exploded view of FIG. 5 illustrates the simplicity of construction, showing that the bottom plate 17, striker plates 18,19 and elastomeric block 22, are all merely inserted into the compartment 16, and are retained by the cover plate 15. A plurality of cap screws 35 fasten the cover plate 15 into position.

It should be noted that while the elastomeric block 22 has been depicted as homogeneous, with a rectangular shape of constant cross-section, non-homogeneous or composite material having various shapes and cross-sections may be substituted to achieve desired deceleration characteristics.

While the invention has been shown embodied in a robot having a rotary platform, it may be appreciated by those skilled in the art that the lug 23; striker plates 18,19; and elastomeric block 22 components may be utilized for controlling linearly movable members as well, for example; gantry type robots having elevated rails and slide members.

The invention may find use in other similarly-configured assemblies, such as machine tools and the like. It may also be appreciated that for unidirectional stopping, only one striker plate 18 is needed, and the elastomeric block 22 is then directly backed up by the compartment sidewall 31.

Further, while the invention has been shown and described in connection with a preferred embodiment, it is not intended that the invention be so limited, but rather the invention extends to all such designs and modifications as come within the scope of the appended claims.

What is claimed is:

1. In a robot having a relatively stationary base and a relatively moving base, improved means for controlling deceleration and stopping of said moving base, comprising:
   (a) a lug affixed to, and depending from, said moving base, said lug defining a lug path while moving;
   (b) an elastomeric block supported on said stationary base, said base having means for rigidly backing said block, said block being located in line with said lug path and interposed between said lug and said means for rigidly backing said block;
   (c) a striker plate having an impact surface and an edge defined around said surface, said plate being located next to said block and edge-wise supported on said stationary base with a portion of said impact surface extending into said lug path between said elastomeric block and said lug; and
   (d) means for permitting substantially pivoting of said striker plate about its supported edge as said plate is contacted by said lug.

2. In a robot having a relatively stationary base and a relatively moving base, improved means for controlling bidirectional deceleration and stopping of said moving base, comprising:
   (a) impact lug means affixed to, and depending from, said moving base defining a lug path while moving;
   (b) a base compartment having a pair of rigid opposing sidewalls;
   (c) an elastomeric block disposed in said base compartment between said walls and aligned with said lug path; and
   (d) a pair of striker plates, each having an impact surface and an edge defined around said surface, each said plate supported in said compartment on at least one edge, adjacent a respective one of said walls and disposed between said walls and said elastomeric block, and wherein a portion of said impact surface of each plate extends into said lug path;

whereby said plates are alternatively pivotally movable in opposing directions toward one another against said elastomeric block, and said plates are rigidly held in opposing directions away from one another, so that, as a respective one of said plates is contacted by said impact lug and pivotally moved in one direction against said block, the non-contacted plate is rigidly held from pivoting in the same direction.

* * * * *